(12) United States Patent
Fujii et al.

(10) Patent No.: US 7,006,041 B2
(45) Date of Patent: Feb. 28, 2006

(54) RADIO RECEIVER, RADIO TRANSMITTER AND IMPEDANCE CONTROL METHOD

(75) Inventors: Hiromasa Fujii, Yokosuka (JP);
Shigeru Tomisato, Okayama (JP);
Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/892,147

(22) Filed: Jul. 16, 2004

(65) Prior Publication Data

US 2005/0054318 A1    Mar. 10, 2005

(30) Foreign Application Priority Data

Jul. 25, 2003    (JP)    ............................. 2003-202002

(51) Int. Cl.
*H01Q 3/24*    (2006.01)
(52) U.S. Cl. ...................................... 342/372; 342/368
(58) Field of Classification Search ................ 342/368, 342/372, 373, 374, 385
See application file for complete search history.

(56) References Cited

U.S. PATENT DOCUMENTS

| 5,999,889 | A  | * | 12/1999 | Tietsworth ..................... 702/65 |
| 6,448,924 | B1 | * | 9/2002  | Hafer, Jr. ...................... 342/28 |
| 6,643,497 | B1 | * | 11/2003 | Kouyama ..................... 455/83 |
| 6,768,472 | B1 | * | 7/2004  | Alexopoulos et al. ...... 343/860 |
| 2004/0009754 | A1 | * | 1/2004 | Smith ........................... 455/82 |

FOREIGN PATENT DOCUMENTS

| EP | 1 233 565 | 8/2002 |
| EP | 1229664 A1 | * 8/2002 |
| WO | WO 9943096 A1 | * 8/1999 |
| WO | WO0079769 A1 | * 12/2000 |
| WO | WO 01/35490 A1 | 5/2001 |

OTHER PUBLICATIONS

Tetsushi ABE, et al., "A Hybrid MIMO System Using Spatial Correlation", IEEE, vol. 3, XP-010619313, Oct. 27, 2002, pp. 1346-1350.

Gerald J. Foschini, et al., "Simplified Processing for High Spectral Efficiency Wireless Communication Employing Multi-Element Arrays", IEEE Journal on Selected Areas in Communications, vol. 17, No. 11, Nov. 1999, pp. 1841-1852.

Sirikiat Lek Ariyavisitakul, "Turbo Space-Time Processing to Improve Wireless Channel Capacity", IEEE Transactions on Communications, vol. 48, No. 8, Aug. 2000, pp. 1347-1359.

Katsumi Sakai, et al., "Study of Multi-point Repeater System with Multiple Input Multiple Output Method", The Institute of Electronics, Information and Communication Engineers Technical Report of IEICE, pp. 125-132, (with English Abstract).

* cited by examiner

*Primary Examiner*—Dao Phan
(74) *Attorney, Agent, or Firm*—Oblon, Spivak, McClelland, Maier & Neustadt, P.C.

(57) ABSTRACT

A radio receiver includes a plurality of antenna elements for receiving a radio signal from a radio transmitter; a setting part changing an impedance of at least one of the plurality of antenna elements according to an instruction signal; a measuring part measuring a change in throughput in a received signal caused due to the change in the impedance; and an instruction part providing the instruction signal which is changed in response to the measurement result.

11 Claims, 9 Drawing Sheets

RADIO RECEIVER, RADIO TRANSMITTER AND IMPEDANCE CONTROL METHOD

BACKGROUND OF THE INVENTION

1. Field of the Invention

The present invention generally relates to a radio communication technical field, and, in particular, to a radio receiver, a radio transmitter and impedance control method for performing radio communication with the use of a plurality of antenna elements.

2. Description of the Related Art

As a technology especially taking into an attention for such a technical field, a so-called multi-input multi-output (MIMO) communication system is known. This system has been developed for improving transmission rate per capacity, i.e., per frequency (bps/Hz) by preparing a plurality of antenna elements at each of a transmission end and a reception end, and simultaneously transmitting different signals for the respective antenna elements within a common frequency band. The above-mentioned capacity is also called throughput. For example, European Patent Application Publication No. 1233565 and G. J. Foschini, et al., 'Simplified Processing for High Spectral Efficiency Wireless Communication Employing Multi-Element Arrays', IEEE Journal on Selected Areas in Communications, Vol. 17, No. 11, pp. 1841–1852, November 1999 disclose communication methods of the MIMO system. Also, numerical expressions or such for the throughput (capacity) achieved by the MIMO system is disclosed by Sirikiat Lek Ariyavisitakul, 'Turbo Space-Time Processing to Improve Wireless Cannel Capacity', IEEE Trans. on Commun, vol. 48, no. 8, August 2000.

SUMMARY OF THE INVENTION

In the MIMO system, it is possible to most efficiently increase the capacity in a case where respective channels assumed between a transmitter and a receiver are independent from each other. Conversely, in a communication environment such as a line-of-sight environment in which inter-cannel correlation (i.e., channel correlation) is high, it is difficult to increase the capacity, or the achievable capacity may be reduced.

There is a technology of reducing the influence of the channel correlation by sufficiently increasing distances between the respective antenna elements, for such a case. However, if such a method is applied, an area or a size required for providing the plurality of antenna elements in total may increase, which may cause a disadvantage in terms of miniaturization of the apparatus configuration.

According to another technology to cope with the channel correlation, a repeater is provided on the way of a propagation channel, multi-path wave is generated intentionally, a receiver is made to process many paths, and thereby, the influence of channel correlation is reduced (see Katsumi Sakai, Tsuyoshi Tamaki and Takashi Yano, 'Multi-point Repeating Transmission System according to MIMO system', Electronic Information and Communication Society, Singaku-Giho, RCS2001-263, for this technology). However, by applying such a technology, it is necessary to provide a repeater for each radio base station, which may increase equipment investment required or technical and economical burdens required for operation and maintenance. Further, another problem may occur such as that of coping with coupling loop interference in an own repeater, coupling loop interference with another repeater or such.

Generally speaking, when received power is large, throughput in a received signal is high. However, in a communication environment described above in which channel correlation is high, there is a case where the throughput does not depend on the received power. In some case, even when antenna control is performed such as to increase the received power, the throughput is deteriorated.

The present invention has been devised for the purpose of solving at least one of these problems, and an object of the present invention is to provide a radio receiver, a radio transmitter and an impedance control method by which deterioration in throughput otherwise caused by channel correlation in a radio communication system performing transmission or reception of a radio signal with the use of a plurality of antenna elements can be effectively reduced.

According to the present invention, a radio receiver includes:

a plurality of antenna elements for receiving a radio signal from a radio transmitter;

a setting part changing an impedance of at least one of the plurality of antenna elements according to an instruction signal;

a measuring part measuring a change in throughput in a received signal caused due to the change in the impedance; and an instruction part providing the instruction signal changed in response to the measurement result to the setting part.

Thereby, it becomes possible to reduce deterioration in throughput due to channel correlation.

According to the present invention, not only received power is aimed at but also impedance control in the antenna elements is performed so as to increase the throughput. In this configuration according to the present invention, it is not necessary to provide a repeater in a radio propagation channel, and thus, it is possible to solve economical and technical problems otherwise occurring accompanying the repeater in the prior art.

According to one aspect of the present invention, a power measuring part measuring received power and a correlation value measuring part measuring a correlation value between signals received by different antenna elements are provided. Thus, in order to increase the throughput, not only the received power but also the correlation value is considered. Accordingly, it becomes possible to improve the throughput by well controlling the channel correlation. The throughput and a change amount in the throughput can be obtained with the use of a table or a mathematical formula which indicates a correspondence relationship between the received power, the correlation value and the throughput.

According to another aspect of the present invention, by measuring signal power obtained after equalization determined according to a reception method applied, it becomes possible to highly accurately measure the received power, and thus, it becomes possible to estimate the throughput at high accuracy.

According to another aspect of the present invention, a plurality of driving antenna elements and at least one parasitic antenna element provided around the plurality of driving antenna elements are used, and each parasitic antenna element is connected with a reference electric potential through a variable impedance element. Since the variable impedance to be controlled is provided only for the parasitic antenna element, it is possible to effectively reduce the number of objects to be controlled. Accordingly, in terms of simplification of apparatus configuration, it is advantageous to apply such a parasitic antenna element.

Further, the present invention may be applied not only for one-to-one communication but also for one-to-many communication such as that performed by a radio base station which communicates with many users. In such a case, linear combination of change amounts in throughputs for the respective user is calculated, and, the impedances of the antenna elements should be controlled so that the linear combination thus obtained may be improved. By adjusting a linear combination coefficient for the linear combination, it is possible to improve the total throughput while giving a priority to communication for a specific user.

Thus, according to the present invention, in a system in which transmission or reception of a radio signal is performed with the use of a plurality of antenna elements, deterioration in throughput otherwise caused by channel correlation can be effectively reduced.

BRIEF DESCRIPTION OF THE DRAWINGS

Other objects and further features of the present invention will become more apparent from the following detailed description when read in conjunction with the accompanying drawings.

DESCRIPTION OF THE PREFERRED EMBODIMENT

Figure 1:
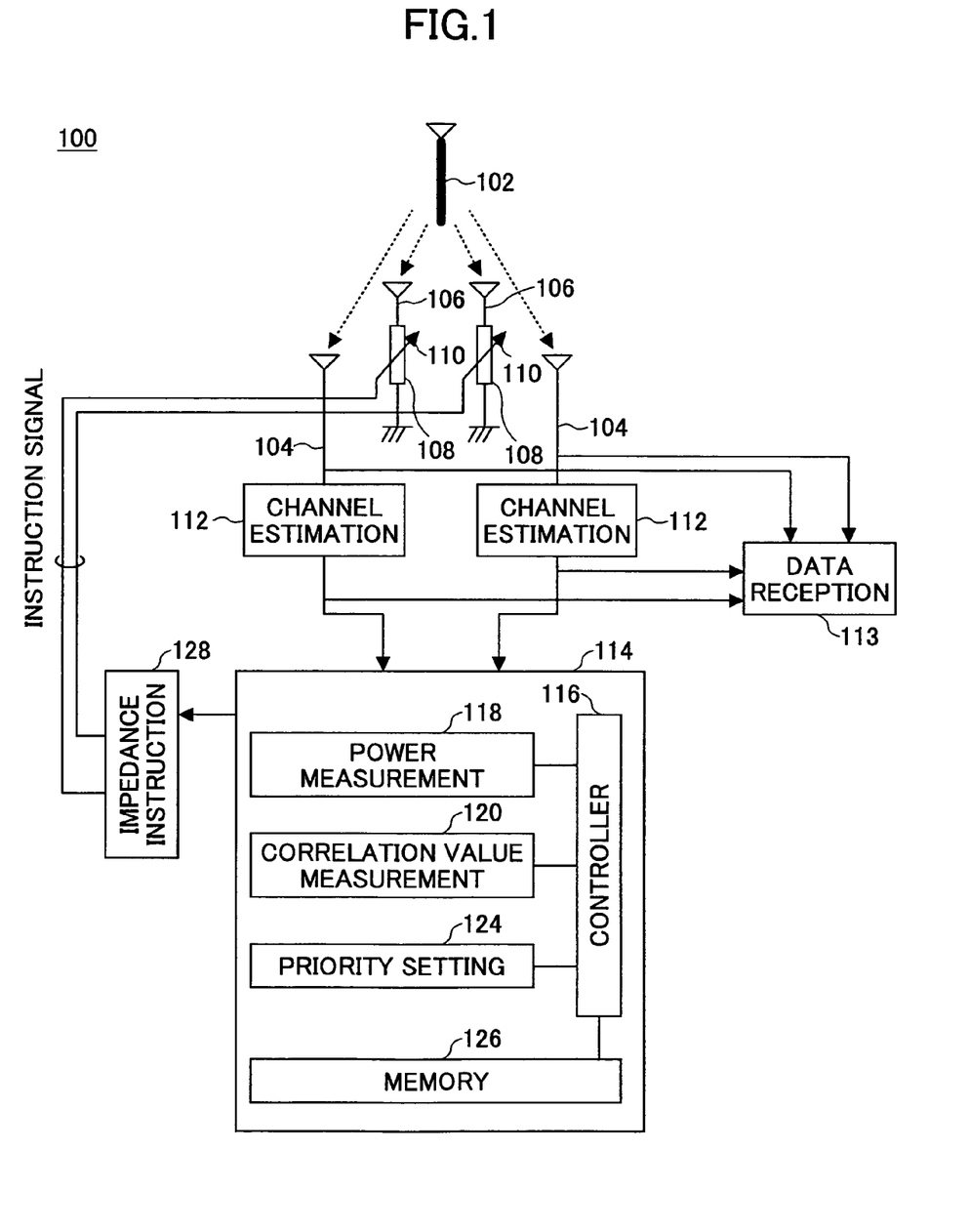
FIG. 1 shows a functional block diagram concerning a main function of a radio receiver according to one embodiment of the present invention.

FIG. 1 shows a functional block diagram of a radio receiver according to one embodiment of the present invention. In FIG. 1, among parts/components of the radio receiver, functional blocks particularly relating to the present invention are shown. The radio receiver 100 includes a plurality of antenna elements 104 and 106 for receiving a radio signal transmitted from a transmission antenna 102 of a radio transmitter. For the purpose of simplification, the transmission antenna 102 is expressed as a single element. However, it is also possible to receive signals transmitted from a plurality of antenna elements. In FIG. 1, as the plurality of antenna elements, two driving antenna elements 104 and two parasitic antenna elements 106 are provided. However, in general, it is possible to provide an arbitrary number of antenna elements. However, in order to perform communication in the MIMO system, at least two driving antenna elements are required.

Each of the parasitic antenna elements 106 is connected to a reference electric potential (for example, to the ground potential) via a variable impedance element 108. Further, an impendence of each variable impedance element 108 can be changed by an impedance setting part 110. The impedance generally includes a resistance component and a reactance component. In the present embodiment, the resistance component is fixed while the reactance component is changed. The reactance component can be changed for example by changing a capacitance of a relevant capacitor.

The radio receiver 100 includes a channel estimation part 112 connected with each driving antenna element 104. Channel estimation can be performed as a result of change in amplitude, a delay or a phase of a received signal received by means of each antenna element caused due to a propagation channel applied being measured by means of the channel estimation part 112. For example, the channel estimation is performed with the use of a known signal or a reference signal inserted into each frame. A signal received by means of the driving antenna element 104 is input to a data receiving part 113 together with the channel estimation result. The data receiving part 113 performs equalization processing such as phase rotation for each channel, combination of signals and so forth, regular processing for restoring from the received signal including error correction code, and so forth.

Further, the radio receiver 100 includes an impendence control part 114 connected to the output terminal of the channel estimation part 112, which may act as a 'measuring part'. The impedance control part 114 has a controller part 116 controlling each element included in the control part 114. The impedance control part 114 has a power measuring part 118 measuring a power level of the received signal. The impedance control part 114 has a correlation value calculation part 120 calculating a correlation value concerning the signal received via each antenna element. The impedance control part 116 has a priority setting part 124 to be used for controlling receiving operation in consideration of a priority concerning communication for each user. Further, the impedance control part 116 has a memory part 126, which stores various sorts of information necessary for the impedance control. The information stored includes, for example, table information indicating correspondence relationship between a power value, a correlation value and a throughput. Further, as is necessary, other table information may be prepared to be applied for a situation in which a spatial multiplexing number, a modulation level, a coding rate or such can be changed so that more accurate throughput measurement may be achieved. Such table information may be previously obtained experientially or by means of simulation.

The radio receiver 100 has an impedance instruction part 128 which generates an instruction signal indicating how to change the impedance of each variable impedance element 108 according to the output of the impedance control part 114, and provides the thus-obtained signal to the respective one of the impedance setting parts 110. The instruction signal may be either a digital signal or an analog signal, and one thereof may be appropriately selected according to a particular use.

Although the impedance control part 114 includes many function blocks shown, it is not necessary to perform all the operations corresponding thereto. The impedance control part 114 according to the present invention may be configured to perform only operations corresponding to part of these blocks. Further, it is possible to configure the impedance control part 114 such that it may include other function blocks instead of the function blocks shown.

Figure 2:
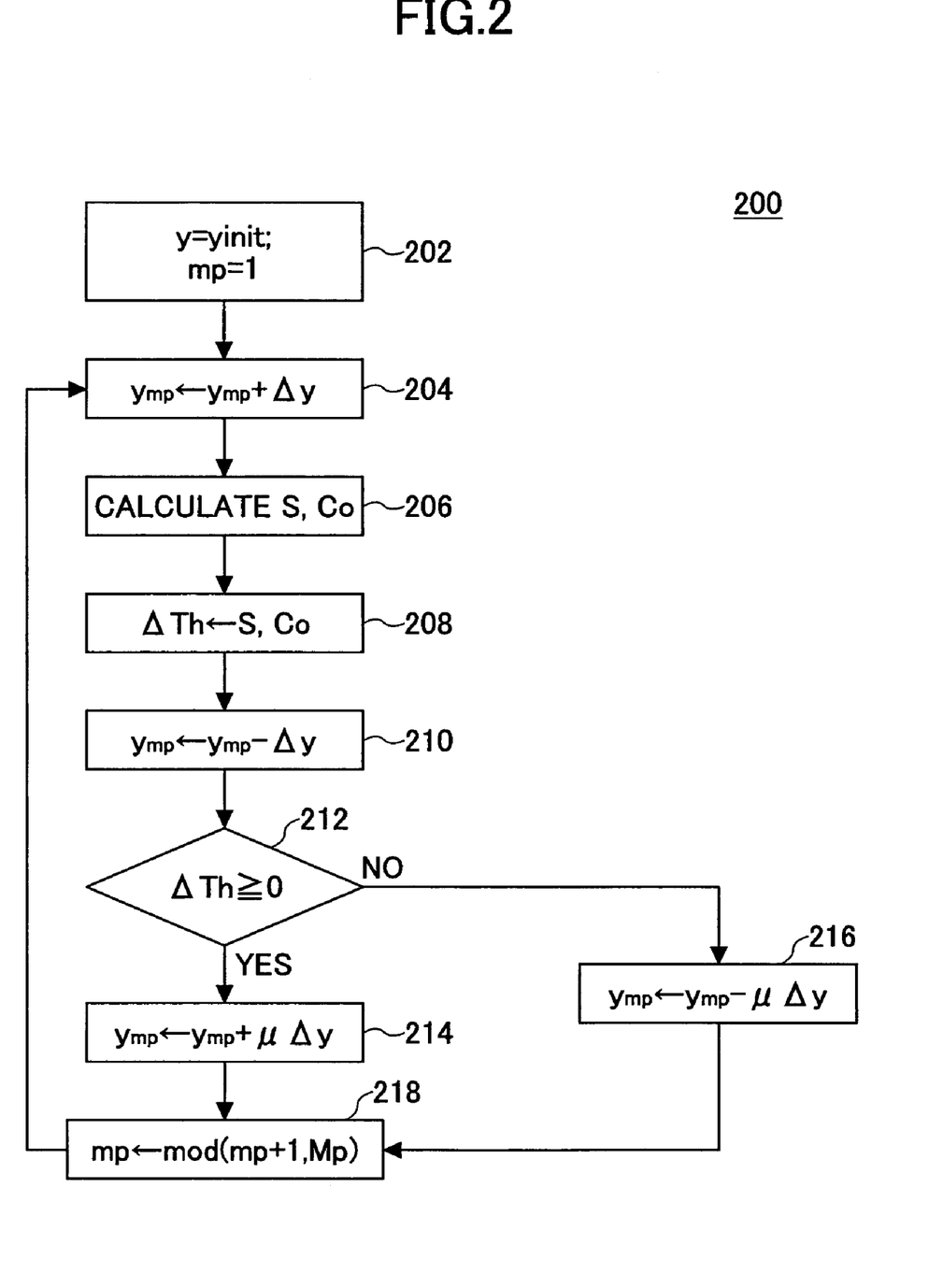
FIG. 2 shows an operation flow chart in the embodiment of the present invention.

FIG. 2 shows a flow chart 200 of an example of operation performed by the radio receiver 100 shown in FIG. 1. In general, the operation of the flow chart 200 is such that the radio receiver 100 appropriately may adjust the value in each variable impedance element 108 while receiving the radio signal and improving the throughput of the received signal.

In Step 202, initialization of each parameter is performed. For example, impedances of all the variable impedance elements are set to initial values. In the present embodiment, impedances $y_1$ and $y_2$ of the two variable impedance elements 108 are set to initial values by means of the impedance setting parts 110 (for example, $y_1=y_2=y_{init}$). 'mp' is a parameter for distinguishing control objects 108. In the present embodiment, mp=1, 2.

In Step 204, the impedance $y_1$ of the first variable impedance 108 is changed by a predetermined amount $\Delta y$. The plurality of antenna elements 104 and 106 receive radio signals while influencing each other. When the impedance $y_1$ of the first parasitic antenna element 106 is changed, strength or a phase of the signal received by each driving antenna element 104 may be influenced thereby.

In step 206, a received power and a correlation value of the signals received after the impedance $y_1$ is thus changed are measured. These operations are performed mainly by the power measuring part 118 and the correlation value measuring part 120 under control of the controller part 116. First, the power measuring part 118 calculates a received power value Sn (n=1, 2) received by the respective driving antenna elements 104, according to the following formula (1):

$$S_n = \sum_{m=1}^{M} \sum_{l=1}^{L} |h_{mn}(l)|^2 \quad (1)$$

There, 'n' (=1, 2) is a parameter for distinguishing the driving antenna elements 104. 'M' denotes the number of the driving antenna elements, and in the present embodiment, M=2. 'l' denotes a parameter for distinguishing respective ones of multi-path channels included in the relevant radio channel, and, in the present embodiment, L paths are assumed in the order from an antecedent wave (l=1). '$h_{nm}(l)$' denotes channel state information concerting an l-th path (channel) between an n-th antenna at the transmission end and an m-th antenna at the reception end. Further, it is possible to define an impulse response vector $h_{nm}=(h_{nm}(1), h_{nm}(2), \ldots, h_{nm}(L))^T$ having $h_{nm}(l)$ (l=1, 2, ..., L) as vector components, where T denotes transposition.

Then, the correlation value measuring part 120 calculates a correlation value $C_{o,n}$ (n=1, 2) by the following formula (2):

$$C_o, n = \frac{h_{mn} * h_{m'n}}{|h_{mn}| * |h_{m'n}|} \quad (2)$$

This correlation value $C_{o,n}$ indicates correlation between antenna elements m and m' at the reception end with regard to one antenna n at the transmission end. It is also possible to obtain correlation between antenna elements n and n' at the transmission end with respect to one antenna m at the reception end, as shown in the following formula (3):

$$C_o, m = \frac{h_{mn} * h_{mn'}}{|h_{mn}| * |h_{mn'}|} \quad (3)$$

According to the present embodiment, the correlation is obtained according to the above-mentioned formula (2). As can be seen from the definition of the correlation value, the correlation value becomes zero when the two impulse response vectors lie orthogonally, while the correlation value becomes the maximum value 1 when both agree with one another so closely that they cannot be distinguished from one another.

In Step 208, with the use of the received power Sn and the correlation value $C_{o,n}$ thus calculated, a change $\Delta T_h$ in throughput is obtained. As shown in the following formula (4), the throughput or capacity $T_h$ which is a transmission rate per unit frequency (bps/Hz) can be regarded as a function depending on the received power Sn and the correlation value $C_{o,n}$:

$$T_h = T_h(Sn, C_{o,n}) \quad (4)$$

A value of the throughput $T_h$ for the given received power Sn and the correlation value $C_{o,n}$ may be obtained from a table previously stored in the memory part 126. It is also possible to obtain a value of the throughput with the use of a mathematical formula, and such a case will be described later. A difference $\Delta T_h$ can be obtained from obtaining the throughputs $T_h$ before and after the change in the impedance provided in Step 204. In other words, the throughput should be obtained before Step 204 is performed. However, in a case where a precedent measurement value of the throughput is not available at a time of first power supply or communication starting occasion, it is possible to only perform measurement of the throughput without performing change in the impedance.

In Step 210, the value of the impedance once changed in Step 204 is returned to the original value. This operation is optional, and thus, may be omitted. However, it is preferable to perform this operation in terms of changing the impedance by a same amount ($\mu\Delta y$) in both Steps 214 and 216 for updating the impedance described later.

In Step 212, it is determined whether or not the throughput has increased as a result of the impedance being changed in Step 204. When the throughput has increased ($\Delta T_h \geq 0$), Step S214 is performed, and the value of the impedance is increased by a second predetermined amount $\mu\Delta y$. On the other hand, when the throughput has decreased ($\Delta T_h < 0$), Step 216 is performed, and the value of the impedance is decreased by the second predetermined amount.

In Step 218, the value 'mp' for distinguishing the parasitic antenna elements 108 is incremented, the processing is retuned to Step 204 and thus the same processing is repeated for the other variable impedance element. In Step 218, Mp denotes the number of the variable impedance elements to be controlled, and, in this case, Mp=2. '(mod (mp+1, Mp))' denotes a function which returns a value mp+1 as it is when the value mp+1 is not larger than Mp, while returning a surplus obtained from dividing mp+1 by Mp when the value of mp+1 is larger than Mp.

Figure 3:
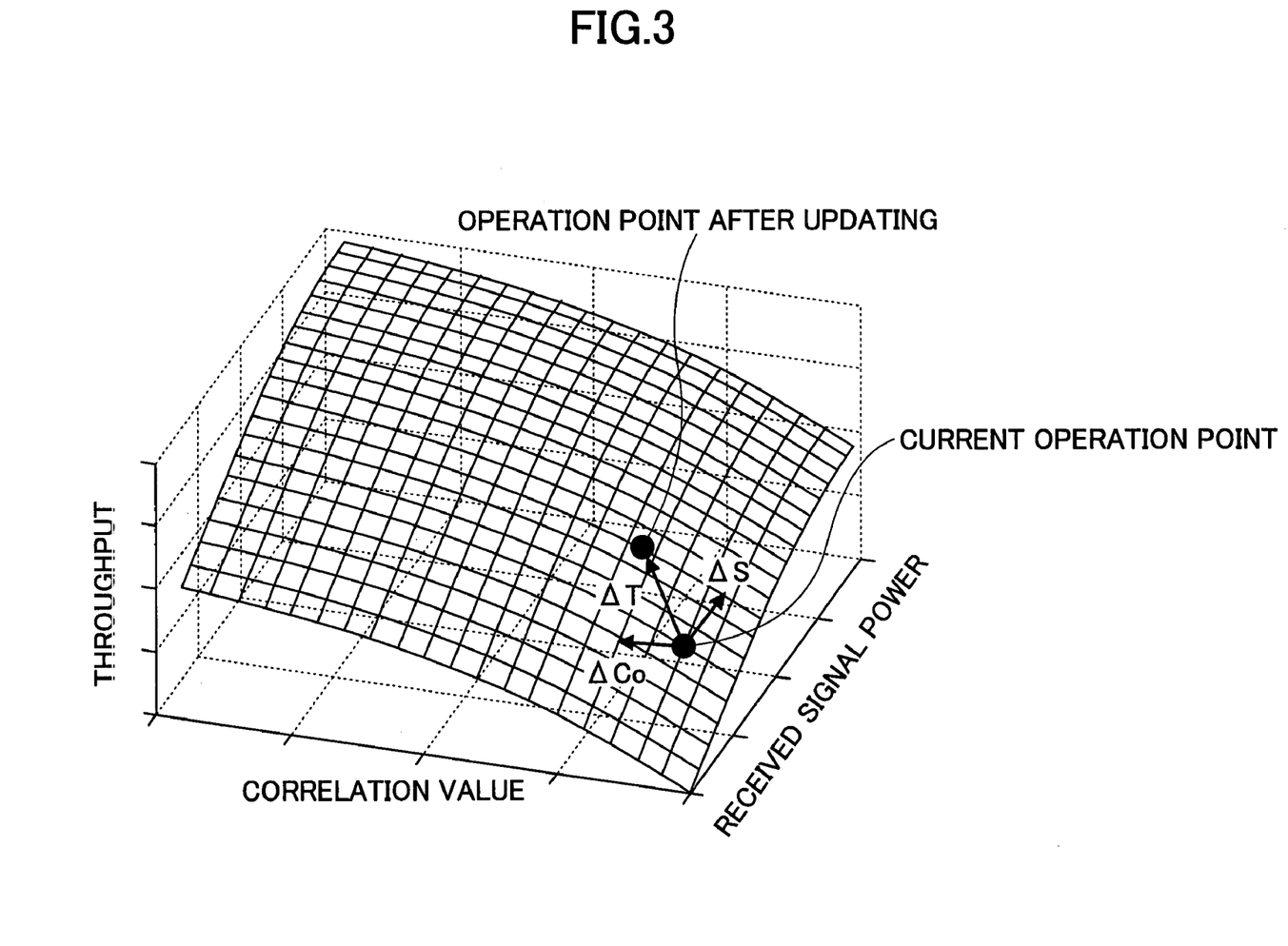
FIG. 3 illustrates operation performed according to the flow chart shown in FIG. 2.

FIG. 3 illustrates operation performed according to the flow chart 200 described above. The throughput $T_h$ (CURRENT OPERATION POINT in the figure) is obtained based on the received power Sn and the correlation value $C_{o,n}$ obtained before the impedance is changed in Step 204. Then, the throughput $T_h$ (OPERATION POINT AFTER UPDATING) is obtained based on the received power Sn and the correlation value $C_{o,n}$ obtained after the impedance is changed in Step 204. In Step 212, a direction of the change in the throughput thus obtained is determined. When the throughput increases, it is preferable that the impedance will be changed in the same direction (+Δy direction). Thus, in Step 214, the impedance is changed in this direction by the second predetermined amount (that is, by +μΔy). Conversely, when the throughput has decreased in response to the change in the impedance, it is not preferable to change the impedance in the same direction, and thus, the impedance is changed in the reverse direction by the second predetermined amount (that is, by −μΔy) in Step 216. Such operation is repeated for each variable impedance element, and thereby, it is possible to update the operation point so as to improve the throughput. The steepest gradient algorithm or such may be applied for setting the values of 'μ' and 'Δy' appropriately for determining the updating step size applied in Step 214 or 216.

Figure 4:
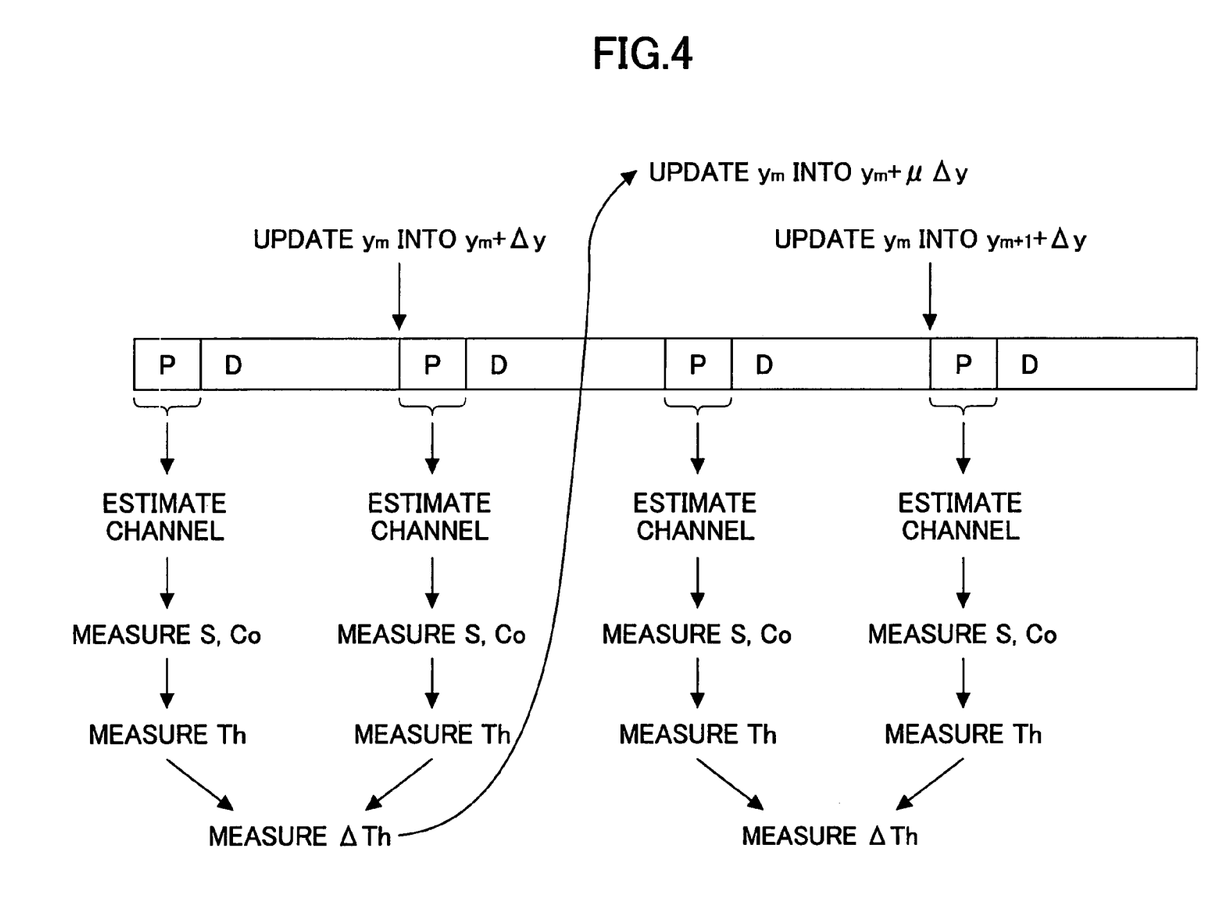
FIG. 4 illustrates an example of the operation shown in FIG. 2 along a time axis.

FIG. 4 illustrates one example of the operation shown in FIG. 2 along a time axis. As shown, the radio receiver 100 receives frames including preamble parts P and data parts D, continuously. The preamble part P includes a known signal or a reference signal known at the reception end. With the use of the known signal, the radio receiver can perform channel estimation. Specifically, for measuring the received power and the correlation value, and determining the throughput, at least duration of 1 frame is required. In order to obtain the throughputs before and after the change of the impedance, at least 2 frames are required. Therefore, until the impedance value is updated in Steps 204 through 214 or 216, at least duration of 2 frames is required. In other words, it is possible to adjust a different one of the variable impedance elements every two frames.

Figure 5:
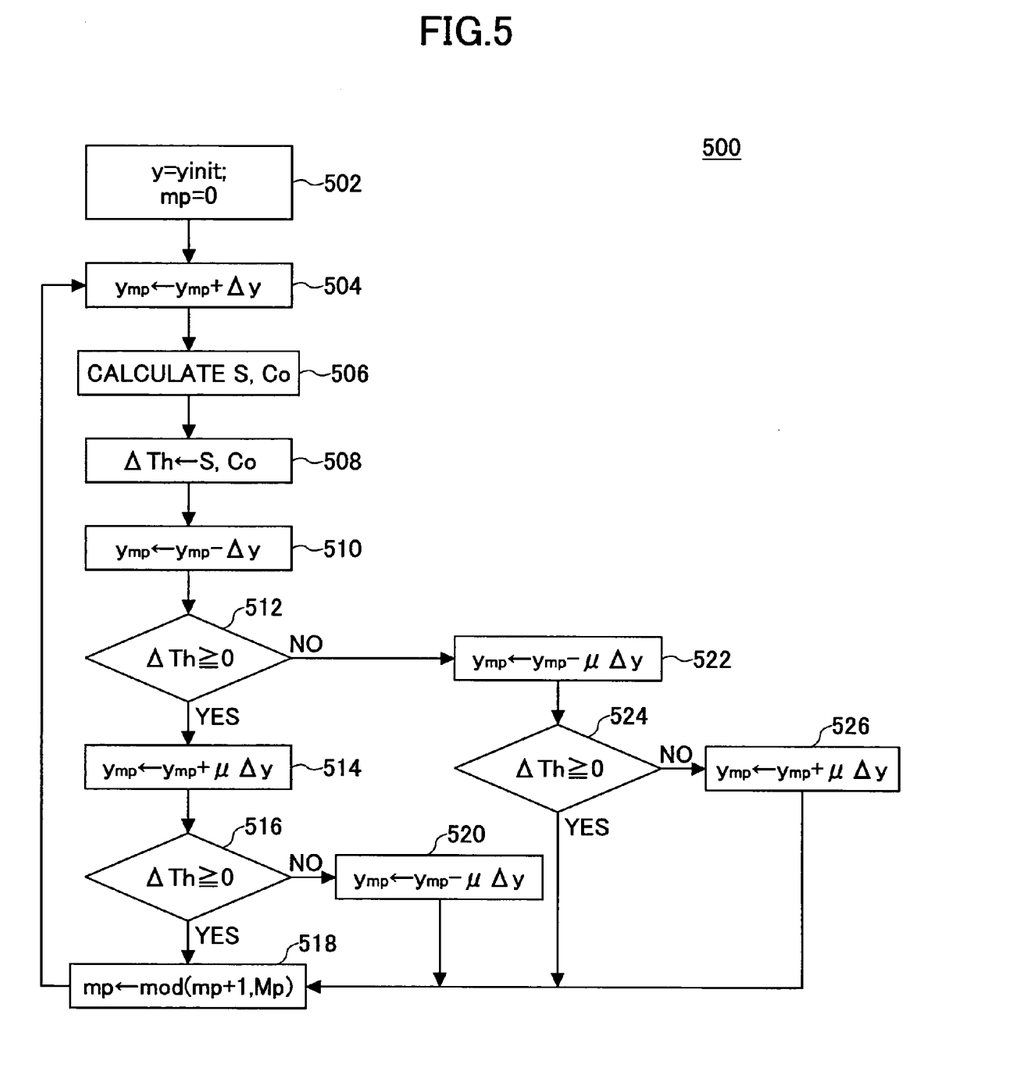
FIG. 5 shows a flow chart of other operation in the embodiment of the present invention.

FIG. 5 shows a flow chart 500 of another example of operation performed by the radio receiver 100 shown in FIG. 1. In general, the flow chart 500 is same as that shown in FIG. 2, except that, in the flow chart 500, after the impedance is changed by the second predetermined amount μΔy, change in the throughput is again measured, and, after that, change of the impedance by the second predetermined amount once made is cancelled when the throughput has not increased as a result of the measurement.

In Step 502, each parameter is initialized. For example, impedances $y_1$, $y_2$ of the two variable impedance elements are set into initial values (for example, $y_1=y_2=y_{init}$).

In Step 504, the impedance $y_1$ of the first variable impedance element 108 is changed by the first predetermined amount Δy.

In Step 506, a received power and a correlation value of signals received after the impedance is thus changed are measured. These operations are mainly performed by the power measuring part 118 and the correlation value measuring part 120 under control of the controller part 114. The power measuring part 118 calculates the received power value Sn (n=b 1, 2) received by the respective one of the driving antenna elements 104, according to the above-mentioned formula (1). The correlation value measuring part 120 measures the correlation value $C_{o,n}$ (n=1, 2) according to the above-mentioned formula (2).

In Step 508, with the use of the thus-calculated received power Sn and the correlation value $C_{o,n}$, a change $\Delta T_h$ in the throughput from the previously obtained one is calculated. A table previously stored in the memory part 126 may be used for obtaining the throughputs $T_h$ for the given received power Sn and the correlation value $C_{o,n}$.

In Step 510, the value of the impedance once changed in Step 504 is returned to the original value by subtracting the once-added first predetermined amount Δy.

In Step 512, it is determined whether or not the throughput has improved truly in response to the change in the impedance given in Step 504. When the throughput has increased ($\Delta T_h \geq 0$), Step 514 is performed, and the value of the impedance is then increased by the second predetermined amount μΔy.

In Step 516, it is then determined whether or not the throughput has improved truly in response to the change in the impedance given in Step 514. When it is determined in Step 516 that the throughput has increased ($\Delta T_h \geq 0$), the control of the present variable impedance is finished, and Step 518 is performed.

In Step 518, the value of the parameter m for distinguishing the parasitic antenna elements 108 is incremented, the processing is returned to Step 504, and the same processing is repeated for the other variable impedance element. On the other hand, when it is determined in Step 516 that the throughput has not increased ($\Delta T_h < 0$), the processing is proceeded with then to Step 520.

In Step 520, the impedance value is decreased by the second predetermined amount. In other words, the change in the impedance performed in Step 514 is cancelled out, and the impedance value is retuned to the original value before the change given in Step 514. Then, Step 518 is performed. Assuming that $\mu \leq 1$, and communication environment does not change remarkably between the respective measuring operations in Steps 512 and 516, a flow in Steps 516 and 520 has not meaning. However, generally, $\mu > 1$, and thus, the first predetermined amount (Δy) and the second predetermined amount (μΔy) differ from one another. Accordingly, even when the throughput increases in response to the change in the impedance by the first predetermined amount in Step 504, the throughput does not necessarily increase in response to the change in the impedance by the second predetermined amount in Step 514. In a case where the current operation point is such that an extreme has been already reached, the throughput may rather decrease when the operation point shifts from the current one. In this term, change in the throughput is preferably measured again in Step 516 for confirmation also after the impedance value is updated in Step 514. When the throughput increases at this time as it is expected (Yes in Step 516), Step 518 is performed. Otherwise, Step 520 is performed, and there, the operation of canceling out of the operation once performed in Step 514 is performed as mentioned above.

When it is determined that the throughput has not improved in Step 512, Step 522 is performed. From Step 522, processing same as that from Step 514 is performed. That is, after the impedance value is updated in Step 522, change in the throughput is again verified in Step 524. Then, when it is verified that the throughput has improved as it is expected (Yes in Step 524), Step 518 is performed. Otherwise, Step 526 is performed, and operation of canceling out of the operation once performed in Step 522 is performed as shown.

Although various arrangements may be applied for a spatial arrangement of the plurality of antenna elements 104 and 106 shown in FIG. 1, it is preferable to apply such an arrangement that channel correction may be effectively reduced.

Figure 6:
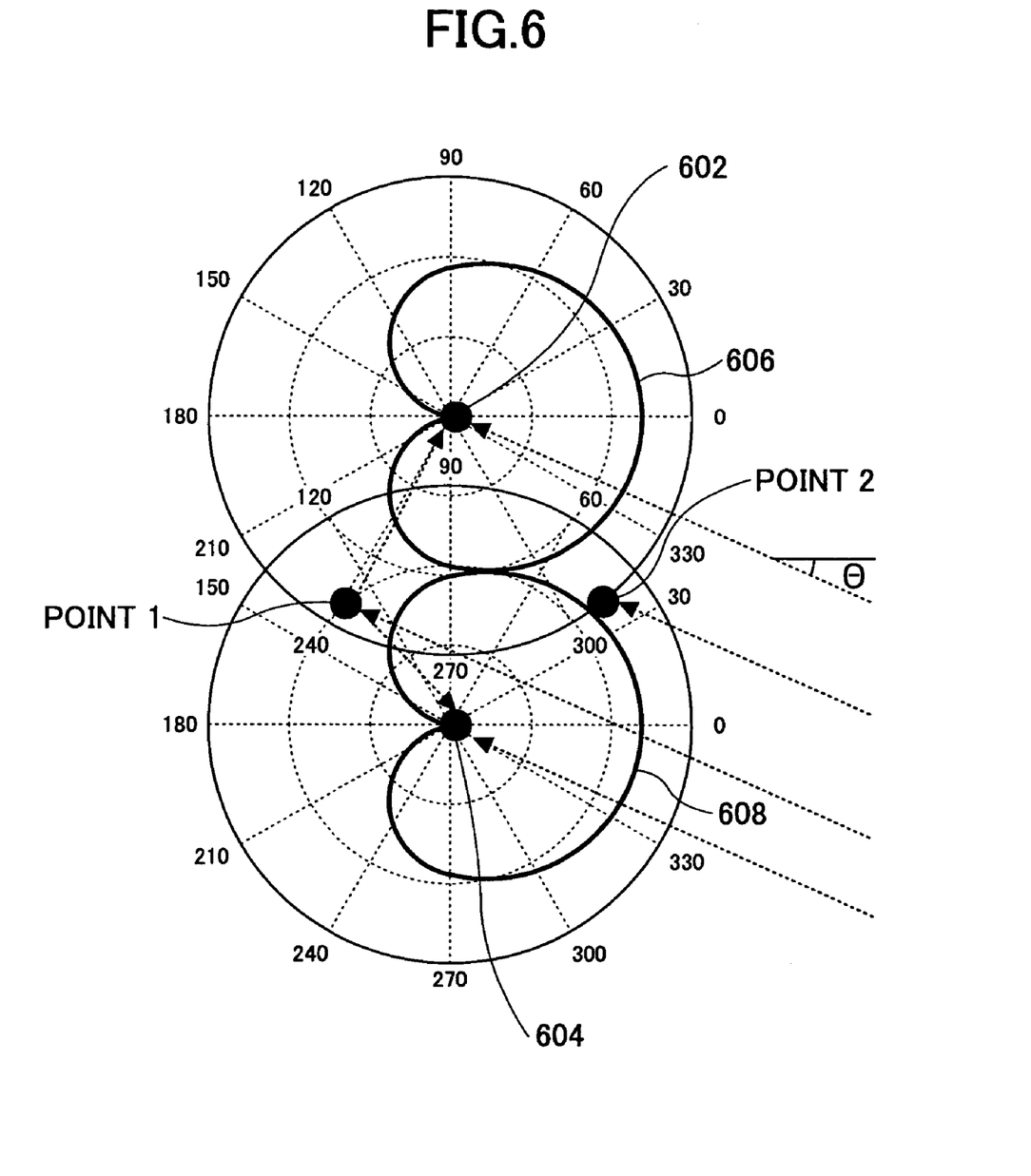
FIG. 6 illustrates a positional relationship between driving antenna elements and a parasitic antenna element.

FIG. 6 illustrates a positional relationship of driving antenna elements 602, 604 and a possible parasitic antenna element. As shown, the driving antenna elements 602 and 604 are disposed side by side with a separation therebetween. As indicated by solid curves 606 and 608 in the figure, the respective driving antenna elements 602 and 604 have directivities approximately in a range of direction between −90 degrees and +90 degrees. Assuming that the parasitic antenna element is disposed at a location indicated by POINT 1 shown, this location is in directions from the respective driving antenna elements 602 and 602 such that the gains are relatively small. Accordingly, in such a case, a multi-path component (reflected wave from the parasitic antenna element) caused by the parasitic antenna element disposed at this location behaves as a wave of arrival having small influence on the driving antenna elements 602 and 604. In contrast thereto, assuming that the parasitic antenna element is disposed at a location indicated by POINT 2 shown, this location is in directions from the respective driving antenna elements 602 and 602 such that the gains are relatively large. Accordingly, in the latter case, a multi-path component (reflected wave from the parasitic antenna element) caused by the parasitic antenna element disposed at the location acts as a wave of arrival having a relatively large influence on the driving antenna elements 602 and 604. In order to distinguish a wave of arrival with the use of a reflected wave caused by the parasitic antenna element and therewith reduce the influence of channel correlation, it is preferable to dispose the parasitic antenna element at the location of POINT 2 rather than the location of PINT 1.

Although it is not assumed that the parasitic antenna element has directivity in the above-mentioned example, it is also possible to apply a parasitic antenna element with directivity. By providing the parasitic antenna element having a high directivity in a direction toward one driving antenna element while having a low directivity in a direction toward another driving antenna element, it is possible to further reduce the channel correlation.

Next, an example in which an impedance control method according to the present invention is applied to a radio transmitter is described. First, in a TDD-type communication system in which an uplink channel and a downlink channel are distinguished in a time-sharing manner and a common frequency is used therefor, it is possible to apply a common impedance value for a time of data transmission and for a time of data reception. In other words, it is possible to apply the impedance control method same as that applied to the radio receiver 100 described above also for a case of data transmission. However, in a communication system other than the TDD-type communication system, since it is not possible to apply a common impedance control method for data transmission and data reception, another control method should be applied.

Figure 7:
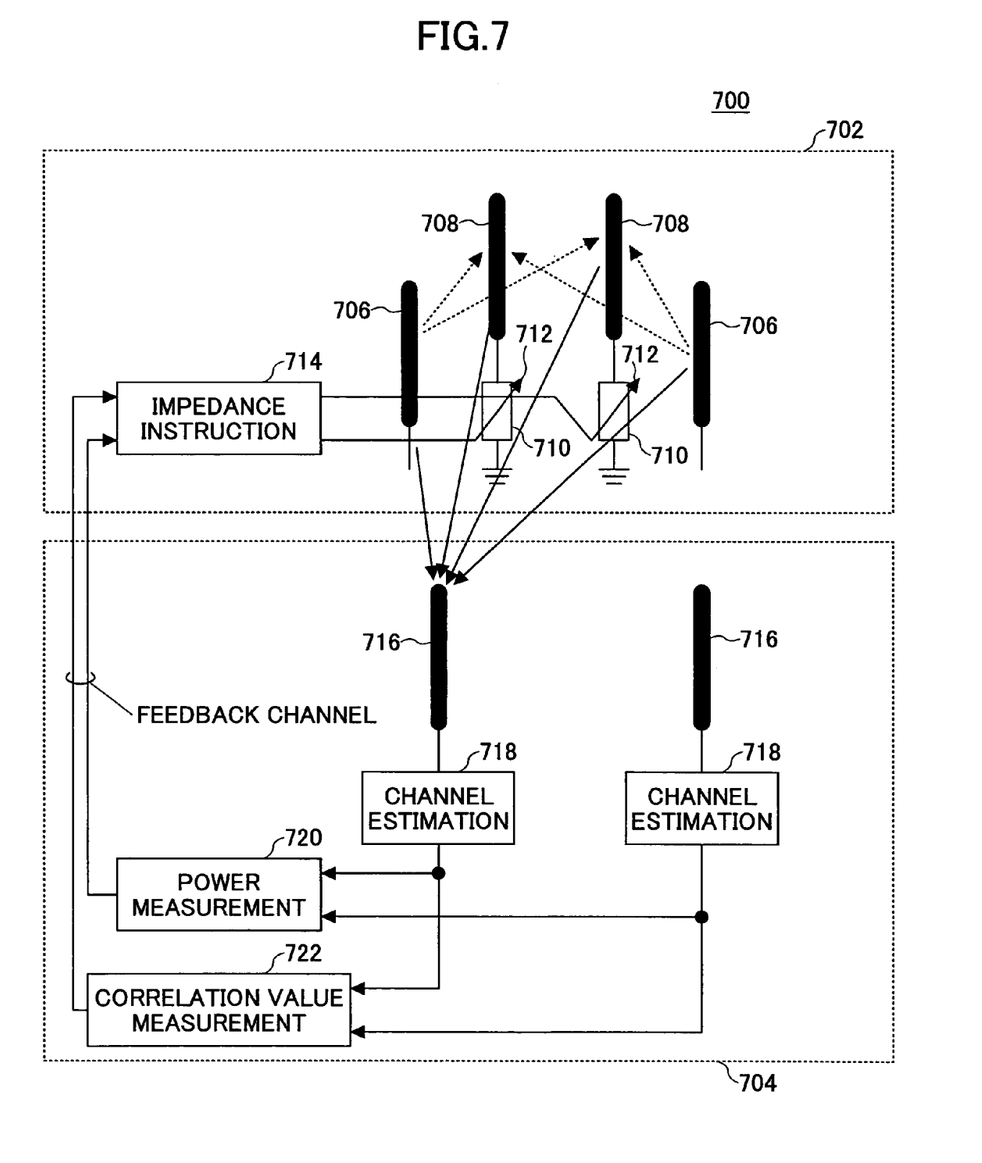
FIG. 7 shows a general configuration of a radio communication system including a radio receiver and a radio transmitter according to the embodiment of the present invention.

FIG. 7 shows a general configuration of a radio communication system including a radio receiver and a radio transmitter according to an embodiment of the present invention. The radio communication system 700 includes the radio transmitter 702 and the radio receiver 704. The radio transmitter 702 has a plurality of antenna elements 706 and 708. These plurality of antenna elements include two driving antenna elements 706 and two parasitic antenna elements 708. Each of the parasitic antenna elements 708 is connected to a reference electric potential (for example, the ground potential) via a variable impedance element 710. An impedance of the variable impedance element 710 is appropriately set by means of a respective one of impedance setting parts 712. An impedance instruction part 714 provides an instruction signal for providing instructions as to a specific value of the impedance of each variable impedance element 710 to be set.

The radio receiver 704 has a plurality of driving antenna elements 716 for receiving a radio signal. Signals received by means of the plurality of driving antenna elements 716 are input to channel estimation parts 718, respectively. Therewith, magnitudes and phases thereof are adjusted according to relevant transmission channels. Outputs from the respective channel estimation parts 718 are input to a power measuring part 720 and a correlation value measuring part 722. Although being omitted for the purpose of simplification, the radio receiver 704 may have an impedance control part same as the impedance control part 114 described above with reference to FIG. 1.

Also the radio communication system 700 described above can perform operations described above with reference to FIG. 2 or 5. However, it is noted that the series of processing is performed by the radio transmitter 702 and the radio receiver 704 in a cooperation manner. First, the radio transmitter 702 changes an impedance of one of the variable impedance elements 710 (in Step 204 in FIG. 2), and transmits a radio signal. The radio signal is then received by the radio receiver 704, which then measures power thereof in the power measuring part 720, measures a correlation value thereof in the correlation value measuring part 722 (in Step 206), obtains a difference in throughput between a previous value and a current value (in Step 208), and determines as to how to change the impedance value after that (in Step 210). Then, the radio receiver 704 transmits the determined result to the impedance instruction part 714 in the radio transmitter 702 via a feedback channel which is a radio channel. Based on this feedback information, impedance updating operation is performed there (in Steps 214 and 216).

Although measurement of the received power and the correlation value, determination of a change direction of the throughput and so forth are performed by the radio receiver 704, while generation of the impedance instruction signal and so forth are performed by the radio transmitter 702 in this example as described above, such a role allocation is not relevant to the present invention. All or part of these operations may be performed by the radio receiver or by the radio transmitter. What is relevant is that, based on the signal received via the antenna elements in the radio receiver 704, the impedance control for the antenna elements in the radio transmitter is performed.

Another embodiment is described next with reference to FIG. 1. In the above-described example, the received power and the correlation value are measured assuming the L multi-path components for each antenna element. However, in the present embodiment, power measurement is performed according to a data receiving method (equalization method) applied, instead of power measurement (according to the above-mentioned formula (1)) directly with the use of the L multi-path components. This is because a received power effectively obtained depends on the data receiving method applied. For example, in a case where data reception is performed with the use of a MMSE (minimum mean squired error) filter, it is possible to determine the received power, which is obtained after equalization, with the use of a MMSE filter coefficient and a channel estimation value. Also in a case where a V-BLAST (vertical-Bell lab's layered space time architecture) or a turbo equalization method is applied, it is possible to obtain the received power for each stream which is expected to be finally obtained in the respective data receiving method.

In the above-described embodiment, the throughput $T_h$ is obtained with the use of the table stored in the memory part 126. However, to use such a table is not relevant to the present invention, and it is also possible to obtain the throughput or the channel capacity with the use of the following formula (5):

$$T_h = \log_2 det\left[I + \frac{1}{\sigma^2}HH^H\right] \quad (5)$$

$$H = \begin{bmatrix} h_{11}(0) & h_{12}(0) & \cdots & h_{1N}(0) \\ h_{12}(0) & \ddots & & \vdots \\ \vdots & & \ddots & \vdots \\ h_{11}(0) & \cdots & \cdots & h_{MN}(0) \end{bmatrix} \quad (6)$$

The throughput obtained with the use of the formula (5) is called 'Shannon capacity'. There, 'I' denotes a unit matrix in a form of M×M. '$\sigma^2$' denotes a noise power density. '$H^H$' denotes a conjugate transposed matrix of a channel matrix H. Accordingly, $HH^H$ becomes a squire matrix in the form of M×M. For the purpose of simplification, the above-mentioned formula (5) shows a case where the total. number of paths L=1. The channel matrix H (formula (6)) is obtained based on the received signal, and the impedance control is performed in such a manner that the above-mentioned throughput $T_h$ may become maximum.

Although one-to-one radio communication is assumed in the above-described embodiment, an impedance control method according to the present invention may also be expansively applied to a case of one-to-many communication such as that of a radio base station which performs communication with many mobile terminals (users).

Figure 8:
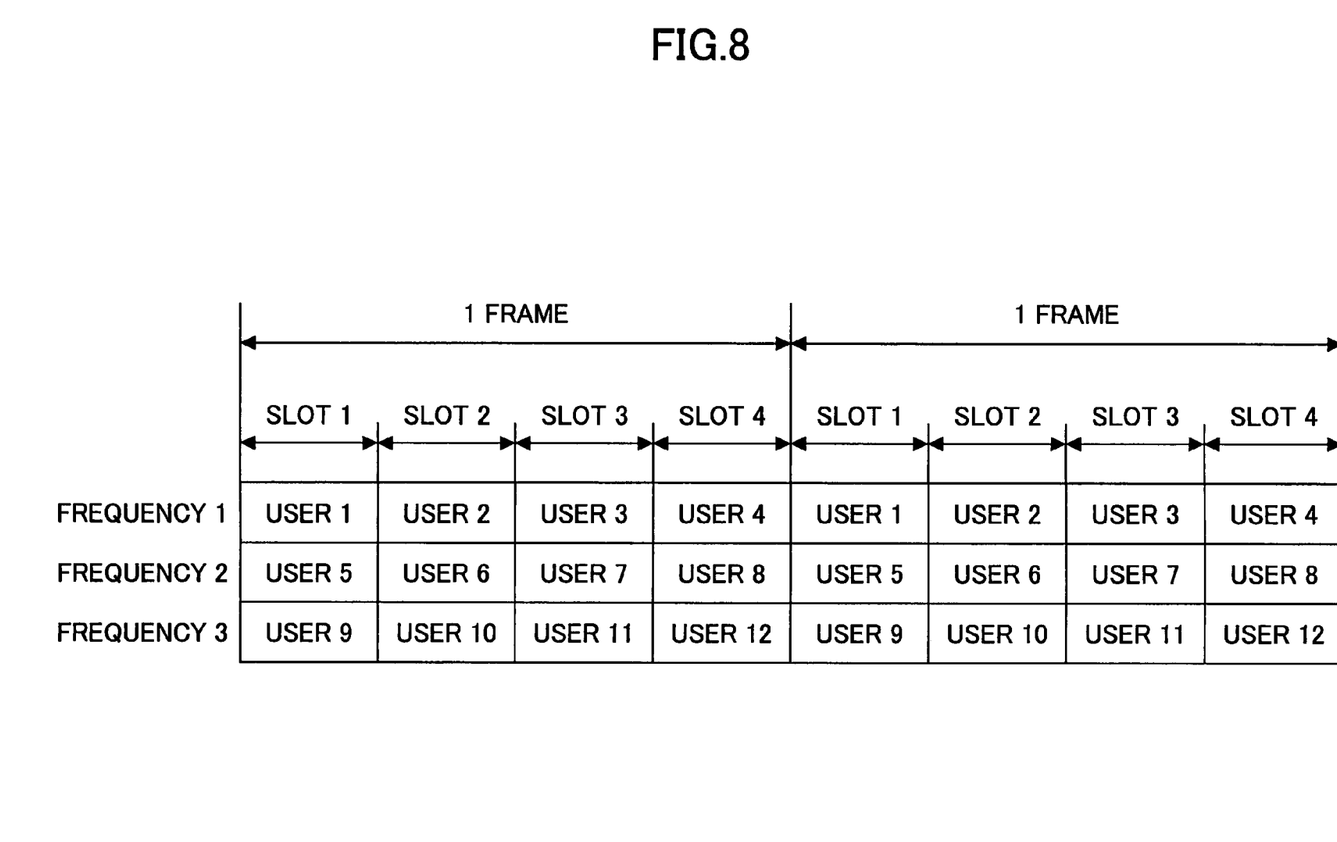
FIG. 8 shows a resource allocation table for allocating communication resources to respective users.

FIG. 8 shows an example of a resource allocation table for allocating communication resources for respective users. One frame has duration for four slots, and each slot can be simultaneously used by three users distinguished by three frequencies. Between the radio base station and the respective users, an impedance optimum for each user (impedance which maximizes the throughput in communication with the user) can exist. However, it is difficult for the radio base station to simultaneously satisfy all. Then, in the present embodiment, a linear combination of the throughputs on the respective users (linear combination of differences in the throughputs) is calculated as shown in the following formula (7), and control is performed in such a manner that the total sum thereof may become maximum. Thereby, the throughput of not the throughput in communication for each particular user but of the entire system is improved. That is, $$\Delta T\_total = \sum_{n \in G} w_n \Delta T_n \quad (7)$$

is calculated, and impedance control is performed in such a manner that '$\Delta T\_total$' may increase. There, 'n' denotes a parameter for distinguishing each user, 'G' denotes a set of all the users with which the radio base station performs communication. '$w_n$' denotes a combination coefficient of the linear combination, i.e., a weight or a priority designated for each user. Various methods are available for determining how to set the weight $w_n$, depending on a particular purpose or a particular use, as will be described (as the following items (a) through (e)). Setting or calculation of the weight $w_n$ is performed by the priority setting part 124 shown in FIG. 1.

(a) First, it is possible to fix each of all the weights $w_n$ to '1', obtain a total sum of differences in throughputs for each time slot, and maximize the total sum. For example, for the first slot, $\Delta T\_total = \Delta T_1 + \Delta T_5 + \Delta T_9$ is calculated (see FIG. 8). Then, control is performed in such a manner that this calculation result may become maximum. After that, the same operation is repeated for each time slot. Thereby, it is possible to simply and equitably improve the throughput of the entire system.

(b) It is also possible to set the weight $w_n$ in the above-mentioned formula (7) according to a communication rate. For example, it is possible to apply '$w_n \propto \max(Rr-Rp, 0)$'. There, 'Rp' denotes the maximum communication rate which can be provided for the relevant user, while 'Rr' denotes a communication rate which the relevant user requests. Thereby, it is possible to give a priority to a user for which the request is not satisfied. The communication rate provided for such a user is in general the maximum communication rate Rp, communication of the user thus gives larger influence on the throughput (bps/Hz) of the entire system (rather than a user for which the communication request is satisfied). Therefore, by giving a priority to a user for which the request is not satisfied, it is possible to effectively improve the throughput of the entire system.

(c) It is possible to relate the weight $w_n$ in the above-mentioned formula (7) to a transmission power amount Pa,n, which indicates a value by which the transmission power can be further increased for a relevant user. For example, it is possible to apply '$w_n \propto (Pa,n+C)^{-1}$'. There $0 \leq Pa,n < Pmax$, Pmax denotes the maximum available power to be transmitted to the relevant user, and the current transmission power for this user is expressed by 'Pmax−Pa,n'. 'C' is a positive constant for avoiding the denominator from becoming zero. By applying such a weight, the antenna impedance is controlled for a value suitable for a user so that the communication quality may be maintained for the user for which the transmission power cannot be further increased (having small Pa,n). On the other hand, for a user for which the transmission power can be further increased, the power is increased so that the communication quality may be maintained.

(d) It is also possible to set the weight $w_n$, in the above-mentioned formula (7) according to a degree of channel change. For example, for a user which moves very fast, channel change between frames is large for the user, and, for such a user, it can be said that the throughput improvement according to the present invention may not be sufficiently effective. Then, it is possible to apply '$w_n \propto (\Delta Hn+C)^{-1}$'. There, '$\Delta Hn$' denotes a difference in channel estimation value for a user n (i.e., a difference between a data reception level for a known signal obtained from a frame and a data reception level for a known signal obtained from a subsequent frame). 'C' denotes a positive constant for avoiding the denominator from becoming zero. By applying such a weight, it is possible to give a priority for a user for which the channel change is small rather than a user for which the channel change is relatively large. Thus, it is possible to efficiently improve the throughput of the entire system.

(e) It is also possible to set the weight $w_n$ in the above-mentioned formula (7) based on a communication type (for example, real-time communication, non-real-time communication, streaming communication or such), an accounting method or such.

Figure 9:
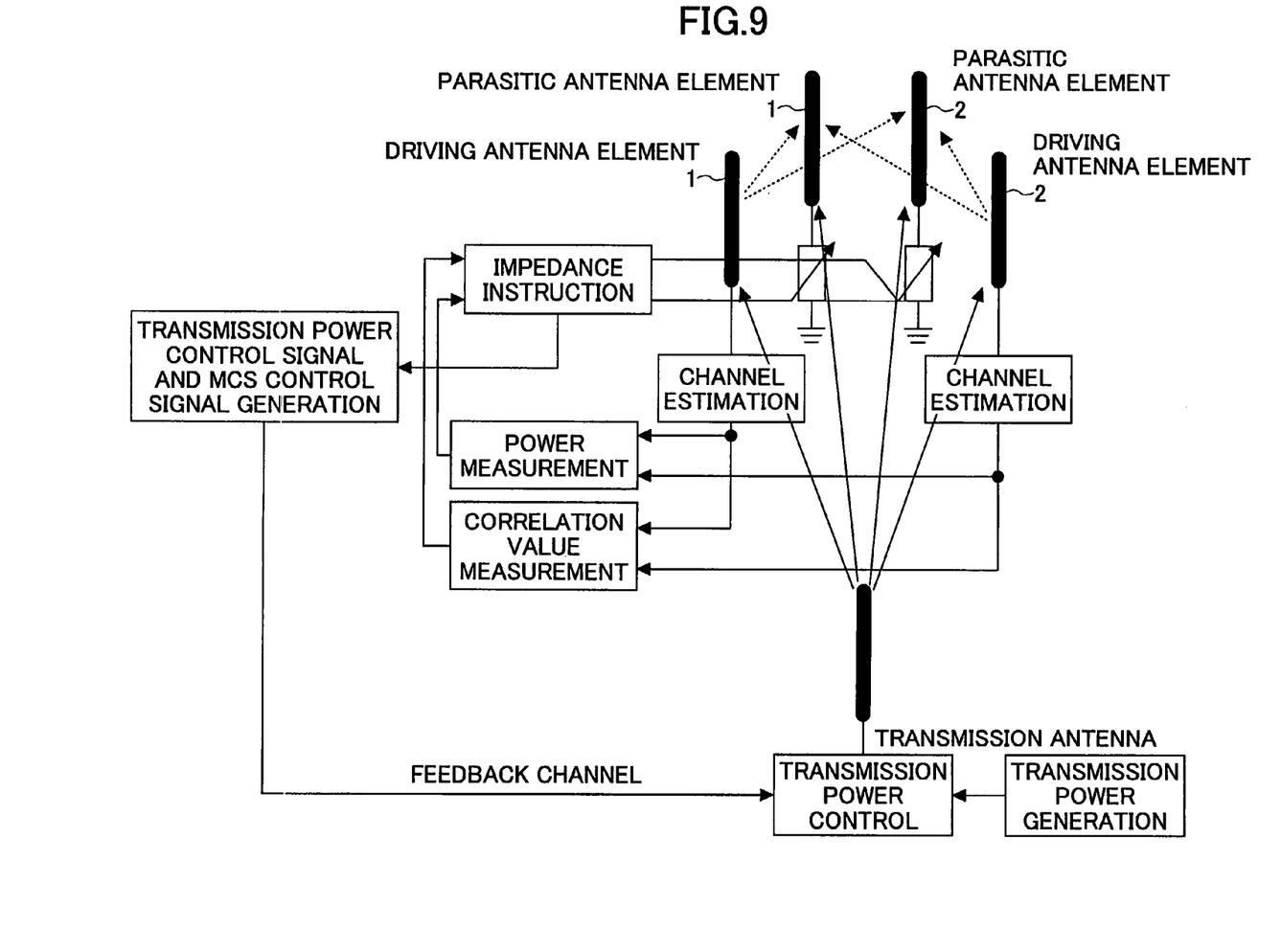
FIG. 9 shows a general configuration of another radio communication system including a radio receiver and a radio transmitter according to the embodiment of the present invention.

As described above, a communication situation may be deteriorated for some users when improvement in the throughput of the entire system is aimed at. However, such a case may be estimated when the weight $w_n$ is set in the priority setting part 124 or when instructions are given by the impedance instruction part 128. Then, in order to achieve radio transmission in a manner suitable for an estimated communication condition for a subsequent frame, it is possible to transmit, to a relevant user, a transmission power control signal (for example, a signal providing an instruction to increase the transmission power), as shown in FIG. 9. Further, in a case where communication is performed while a modulation method (M) or a coding rate (R) actually applied is adaptively changed, it is advantageous to also transmit information of the modulation method or the coding rate suitable for the subsequent frame as an MCS (modulation and coding scheme) control signal to the transmission end in a feedback manner via the feedback channel mentioned above or such, in addition to the above-mentioned transmission power control signal. Generally, a relationship expressed by the following formula holds between these parameters and the throughput $T_h$:

$$T_h = (1 - FER) \times M \times R \times N_{TX}$$

There 'FER' denotes a frame error rate, and '$N_{TX}$' denotes the number of the antenna elements.

As described above, according to the embodiment of the present invention, impedance control is performed not only in consideration of the received power but also in such a manner that the throughput may actually increase. Accordingly, since no repeater should be provided on the way of radio transmission channel, economical and technical issues concerning the repeater otherwise occurring can be eliminated.

Further, since it is not necessary to dispose antenna elements to provide wide separation from each other, it is possible to miniaturize the entire apparatus. Especially, with the use of directivities of the antenna elements, since it is possible to dispose the parasitic antenna element between the driving antenna elements for example, it is possible to effectively shorten the separation between the antenna elements.

Further, according to the embodiment of the present invention, since it is aimed to improve the throughput not only in consideration of the received power but also in consideration of the correlation value, it becomes possible to improve the throughput with well controlling the channel correlation. The throughput and a change amount in the throughput can be obtained with the use of a table indicating correspondence relationship between the received power, the correlation value and the throughput, or with the use of mathematical formulas.

According to the embodiment of the present invention, it becomes possible to measure the received power at high accuracy, with the use of a signal power obtained after equalization being performed thereon according to a relevant data receiving method, and thus, it is possible to estimate the throughput at high accuracy.

According to the embodiment of the present invention, a plurality of driving antenna elements and at least one parasitic antenna element provided around them are used, and each parasitic antenna element is connected to a reference electric potential via a variable impedance element. Since the variable impedance element to be controlled is provided only for the parasitic antenna element, it is possible to effectively reduce the number of control objects. Therefore, in terms of simplification of the apparatus configuration, it is advantageous to use a parasitic antenna element. In this term, a configuration including a parasitic antenna is advantageous rather than another configuration in which all the antenna elements act as driving antenna elements.

According to the embodiment of the present invention, not only one-to-one communication but also one-to-many communication such as that of a radio base station performing communication with many users may be provided. In such a case, linear combination of changes in throughputs for the respective users is calculated, and control of impedances of antenna elements should be made in such a manner that the linear combination may increase. By appropriately adjusting a combination coefficient for the liner combination, it is possible to improve the throughput of the entire system while giving priority to a specific user.

Further, the present invention is not limited to the above-described embodiments, and variations and modifications may be made without departing from the basic concept of the present invention claimed.

The present application is based on Japanese priority application No. 2003-202002, filed on Jul. 25, 2003, the entire contents of which are hereby incorporated by reference.

What is claimed is:

1. A radio receiver comprising:
    a plurality of antenna elements for receiving a radio signal from a radio transmitter;
    a setting part changing an impedance of at least one of said plurality of antenna elements according to an instruction signal;
    a measuring part measuring a change in throughput in a received signal caused due to the change in the impedance; and
    an instruction part providing the instruction signal which is changed in response to the measurement result.

2. The radio receiver as claimed in claim 1, wherein said measuring part comprises:
    a power measuring part measuring received power in the received signal; and
    a correlation measuring part measuring a correlation value between signals received through different ones of the plurality of antenna elements.

3. The radio receiver as claimed in claim 1, further comprising:
    a memory part storing table information indicating correspondence relationship between respective values of the received power, the correlation value and the throughput.

4. The radio receiver as claimed in claim 1, further comprising:
    an equalizing filter equalizing the received signal; and
    a power measuring part measuring power of the received signal based on the signal after being thus equalized.

5. The radio receiver as claimed in claim 1, wherein:
    said plurality of antenna elements comprise a plurality of driving antenna elements and at least one parasitic antenna element.

6. The radio receiver as claimed in claim 1, wherein:
    said measuring part measures change in linear combination in throughput for respective ones of a plurality of users with which communication is performed.

7. The radio receiver as claimed in claim 6, wherein:
    a combination coefficient for the linear combination is determined based on a priority for communication performed with each user.

8. The radio receiver as claimed in claim 1, wherein:
said instruction part provides information of at least one of a transmission power, a modulation method and a coding ratio already estimated in a process of the measurement, as a feedback signal to a radio transmitter via a radio channel.

9. A radio transmitter comprising:
a plurality of antenna elements for transmitting a radio signal to a radio receiver; and
a setting part changing an impedance of at least one antennal element included in said plurality of antenna elements, according to a feedback signal, wherein:
said radio receiver comprises:
a measuring part measuring a change in throughput of a received signal caused by the change of the impedance; and
an instruction part providing the feedback signal to said setting part through a radio channel according to the measurement result.

10. An impedance control method comprising the steps of:
a) changing an impedance of at least one of a plurality of antenna elements provided for receiving a radio signal by a first predetermined amount;
b) measuring a change in throughput of the received signal caused by the change in the impedance; and
c) changing the impedance by a second predetermined amount according to the measurement result.

11. The impedance control method as claimed in claim 10, further comprising the steps of:
d) measuring a change in throughput of the received signal caused by the change in the impedance performed in said step c); and
e) returning the value of the impedance once changed by the second predetermined amount in said step c) into the value occurring before said step c) in response to the measurement result of said step d).

* * * * *